June 16, 1953     H. W. WISHART     2,642,079
HYDRAULIC SHUTOFF VALVE
Filed Jan. 8, 1947

INVENTOR.
HERBERT W. WISHART
BY
*Richard W. Treverton*
ATTORNEY

Patented June 16, 1953

2,642,079

UNITED STATES PATENT OFFICE 2,642,079

HYDRAULIC SHUTOFF VALVE

Herbert W. Wishart, University City, Mo., assignor to Curtiss-Wright Corporation, a corporation of Delaware Application January 8, 1947, Serial No. 720,697

6 Claims. (Cl. 137—219)

This invention relates to fluid valves and more particularly to an automatic hydraulic shut-off valve or fuse of the quantity-measuring type.

In hydraulic systems of aircraft there is the constant danger of ruptured lines cause by gunfire, excessive vibration or other means, such rupture resulting in the inactivation of the equipment connected by the ruptured lines and loss of the fluid supply. There are valves available of both the return-flow and quantity-measuring type for use in hydraulic systems to stop the flow therein in the event such rupture occurs. The valve of this invention relates to the quantity-measuring or metering type wherein a valve poppet is caused to move toward closed position by a proportioning of the fluid flow within the valve. The flow is so proportioned that passage through the valve of a predetermined quantity of fluid, sufficient to actuate the fluid-operated apparatus of the system through one normal operation, will allow the poppet to remain unseated. However, should a rupture occur in the line between the valve and the fluid-operated apparatus, resulting in a greater quantity of fluid passing through the valve, the poppet will be seated and prevent further loss of fluid.

The shut-off valve components are so arranged that when the fluid-operated apparatus has completed its intended operation or when a control valve in the system is closed at or prior to the end of one normal operation, the shut-off valve is automatically reset, being returned to a full open position in readiness for the next operation of the system. At the beginning of such operation, i. e. when the control valve is opened, the shut-off valve will gradually move toward closed position until at the end of the operation a condition of balance is achieved with the valve still in partially open position. Should this balance be destroyed by excessive flow, as will occur upon a rupture in the system, the shut-off valve will continue to move until it is fully closed. After such closing it will require manual resetting, which may be accomplished after the ruptured part of the system has been isolated or repaired.

The foregoing and other objects and advantages will become apparent from the following description of the typical embodiment of the invention shown in the accompanying drawings, wherein.

Figure 1:
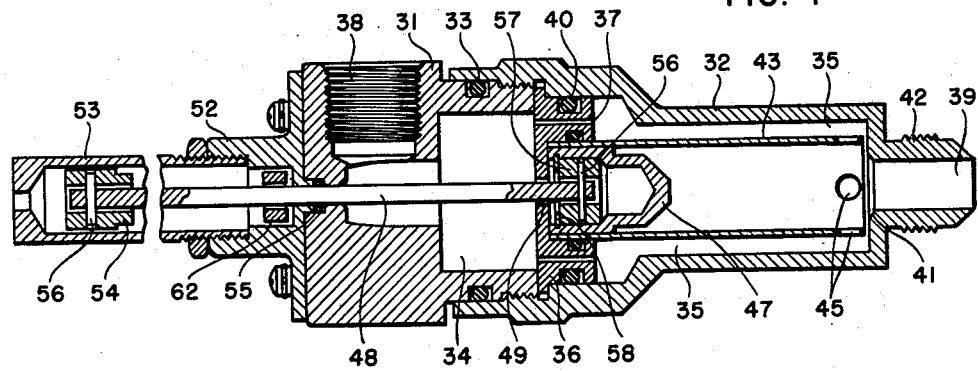
Figure 1 is a longitudinal sectional view through the metering shut-off valve.

As shown in the latter view the system may include a reservoir 11 for hydraulic fluid, a pump 12 which is usually of the positive displacement type, a pressure accumulator 13, metering shut-off valves designated 14 and 14', control valves 15 and 15' and fluid pressure operated devices 16 and 17, and 16' and 17'. These devices may comprise, for example, actuators for the wheel brakes of an aircraft, those indicated at 16 and 17 being for one set of brakes on left and right wheels, respectively, and those indicated at 16' and 17' for another set of brakes on the same two wheels. Fluid drawn from the reservoir through conduit 18 is directed under pressure to the shut-off valves by conduit 19, the accumulator being provided to stabilize the fluid pressure and provide a source of pressure when the pump is not operating. From the outlet of the shut-off valves the fluid passes through conduits 20 to the control valves 15 and 15' by which it is directed at the desired rates through conduits 21 and 22 to the one set of brake actuators 16 and 17, and through conduits 21' and 22' to the other set of actuators 16' and 17'. A valve operating linkage 23 may be provided to control the passage of fluid to the left wheel brake actuators and a similar linkage 24 for fluid to the right wheel brake actuators. The valves 15 and 15', whose detailed construction forms no part of the present invention, are preferably such as to direct return flow of fluid from the brake actuators to a line 25 leading to the reservoir 11. The return flow is not through the shut-off valves.

It will be understood that the shut-off valves 14, 14' will normally be fully open at the beginning of any operation of the system; that in operation the control valves 15 and 15' may be opened to allow fluid to pass to either or both sets of actuators 16, 16' and 17, 17'; and that upon full operation of the latter or upon closing of valves 15, 15' flow of fluid from the source through the shut-off valves 14, 14' will cease. Upon closing of valves 15, 15' from the source fluid in the actuators may return through lines 21, 21', 22, 22' to valves 15, 15' and through them and line 25 to the reservoir. Should any one of the actuators or the lines connected thereto be ruptured or develop a severe leak while the related valve 15 or 15' is open, fluid could be lost from the system to an extent which would render the entire system inoperative, were it not for the shut-off valves 14, 14' which will now be described in detail.

The body of each shut-off valve comprises tubular sections 31 and 32 screw threaded together and sealed by a packing ring 33. Interposed between the sections and providing a wall between inlet chamber 34 and outlet chamber 35 thereof is a partition member 36 provided with metering orifices 37. The periphery of the member 36 is sealed by packing ring 40. Body section 31 is provided with a threaded inlet opening 38 for attachment of a conduit such as 19, while body section 32 has an outlet opening 39 extending through an annular valve seat 41 and through a threaded nipple extension 42 that is adapted for connection to a conduit such as 20.

Figure 2:
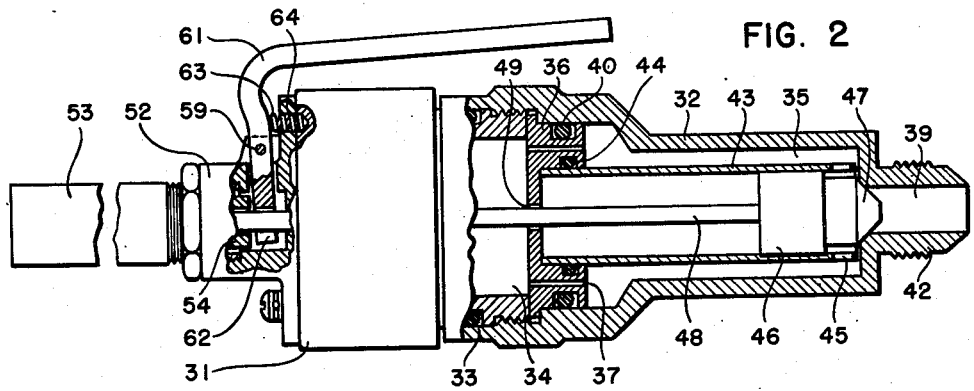
Figure 2 is an elevational view, partly in longitudinal section taken approximately in a plane approximately at right angles to that of Figure 1; and, Figure 3 is a diagram illustrating one kind of system in which the shut-off valve may be employed.
Figure 3:
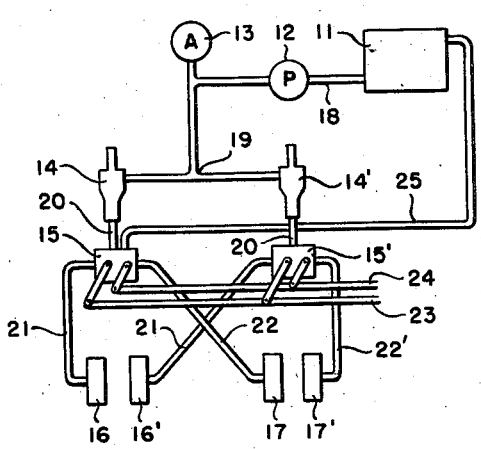

Supported by the partition member 36 and extending longitudinally within chamber 35 is a sleeve 43. The joint between the partition and sleeve is sealed by a packing ring 44, which like the packings 33 and 40 is preferably of the flexible O ring type seated in a groove that is slightly shallower and somewhat wider than the cross-section diameter of the ring when uncompressed. The opposite end of the sleeve 43 is provided with relatively large openings 45 providing free fluid communication between the interior of the sleeve and the surrounding chamber 35. Slidable in the sleeve is a piston 46 having a projection provided with a frusto-conical valve face 47 adapted to close upon the valve seat 41. The valve face projects from the body of the piston a distance sufficient to prevent closure of the openings 45, as may be seen in Figure 2.

Connected to the piston is a rod 48 which extends through an opening 49 in wall 36 of sufficient diameter to provide a metering passage for fluid around the rod and through the wall. The rod also extends through aligned openings in the end wall of body section 31 and a part 52 secured thereto. Part 52 supports a tubular housing 53 for piston rod 48 and a collar 54 that is secured to the outer end of the rod. The openings for rod 48 through parts 31 and 52 may be sealed by a packing ring 55 which may be similar to the packings hereinbefore described. Preferably the collar 54 and piston 46 have lateral play relative to the rod 48, to avoid possible binding of the parts. The play is provided by connections which comprise transverse pins 56 extending through the rod. The piston may comprise an inner sleeve 57 secured to the outer shell by a retainer ring 58, as shown in Figure 1, and the piston constitutes a movable wall dividing the cylinder in which it operates into opposed chambers of which one is contracted and the other expanded upon piston movement in either direction.

Pivoted by a pin 59 to part 52 is a manual reset handle 61. The handle has a forked end 62 engageable with the collar 54. Such engagement may be effected when valve 47 is closed by depression of the handle, i. e. clockwise movement of the handle about pivot 59 as the parts appear in Figure 2. A spring 63 seated in a recess 64 resists such movement of the handle.

During a normal operation of the branch system related to the shut-off valve, fluid under pressure enters chamber 34 through inlet 38. A portion of this fluid passes through metering orifices 37 into chamber 35, while the remaining portion passes through annular metering passage 49 into the interior of tube 43, moving the piston 46 toward valve seat 41. Because of the large openings 45 the pressure in chamber 35 and within the outlet end of tube 43 will be substantially equal at all times. The quantity of fluid passing through orifices 37 compared with the quantity passing through orifice 49 will depend upon the relative flow capacities of these orifices, and will be substantially independent of variations in temperature and viscosity of the hydraulic fluid in the system. Consequently the fluid discharged through outlet 39 will consist partly of a proportioned quantity from chamber 35 and partly of another proportioned quantity of fluid displaced by the piston 46 during its movement toward the valve seat.

The orifices 37 and 49 are so proportioned that when sufficient fluid has passed from valve 14 to fully operate the associated fluid actuators 16 and 17 the piston-valve, 46, 47 has not yet reached its seat 41. Consequently when the operation has been completed or valve 15 has been closed, and flow through the valve 14 has consequently ceased, the pressures on opposite sides of partition member 36 will equalize. Thereupon the piston 46 will be moved to its initial position, to the position shown in Figure 1, due to the difference in effective areas of the opposite faces of the piston resulting from the extension of the piston rod through the casing wall. In this way the valve 14 is automatically reset for a subsequent operation of the system at the conclusion of each normal operation or partial operation.

Should a rupture or excessive leakage occur in the system downstream of the shut-off valve, there will be no cessation of fluid flow through the valve to equalize the pressures on opposite faces of the piston. Consequently in this event the valve 47 will continue to advance and will close upon the seat, thereby preventing further loss of fluid. Once closed the valve will remain so until manually reset due to reduction, in the area exposed to source pressure, of the piston surface facing the outlet.

Upon repair or isolation of the ruptured part of the system the valve may be manually reset by depressing handle 61. This action will cause the collar 54 to be engaged and moved to the left by fork 62, thereby unseating the valve. As soon as the pressures on opposite faces of piston 46 substantially equalize, which will occur as soon as the connected part of the system downstream of the unit 14 is filled with fluid, the normal operating condition described hereinbefore will again prevail, and the reset handle may be released.

It will thus be seen that there is provided a manual reset means by which the system may be restored to normal operation after correction of a condition causing loss of fluid from the system. Automatic resetting, however, results when flow is interrupted, as has been described. The manual resetting of the piston-valve 46, 47 is effected through shifting axially the same piston rod 48 which serves to produce the unbalance of the effective areas of the opposite faces of the piston that is necessary to the normal functioning of the device.

It will be understood that the characteristics of the valve unit may be changed materially by varying the dimensions of orifices 37 and 49 in relation to the volume of flow necessary to operate the particular system in which the shut-off valve is used, and also in the dimensions of orifices 37 and 49 relative to each other. For example, both orifices should be of sufficiently small size so that when there is a relatively small flow through the valve a pressure differential will exist on opposite faces of the piston. This is necessary to overcome the effect of the difference in effective areas of the piston faces and so allow the piston to move toward valve closing position. As to relative dimensions of the orifices, if the area of orifice 49 is reduced relative to the total areas of orifices 37, a greater proportion of the fluid flow will be through orifices 37 and less through passage 49. This will mean that a greater volume of fluid will be required to pass through the valve unit to complete a stroke of the piston-valve from fully opened to fully closed position. If the orifice 49 should be made relatively much larger so as to have little or no metering effect, the device would not operate in the manner hereinbefore described, responsive to quantity of fluid flow, but instead would be responsive to rate of flow. That is, the valve would close only in the presence of a rate of flow such that the restriction of orifices 37 would cause enough pressure differential between chambers 34 and 35 to overcome the effect of the different effective areas of the opposite faces of the piston-valve.

It will be understood from the foregoing description and statement of operation that the same device 14 may be adapted to different systems requiring widely different quantities of fluid for one operation or requiring different minimum rates of flow by simply replacing the single partition member 36 with a similar member having differently sized or proportioned orifices 37 and 49. Such replacement may be effected by unscrewing the sections 31 and 32, no other fastening means being used to hold the partition member in place.

It will be understood further that the specific system and shut-off valve structure shown and described herein merely illustrates one embodiment of the inventive principles that are involved, and that these principles may be utilized in other physical embodiments without departing from the spirit of the invention or from the scope of the appended claims.

I claim:

1. An automatic shut-off valve comprising a cylinder having a piston fitted thereto for sliding, an outlet at one end of said cylinder comprising a valve seat coaxial with the cylinder, a valve on said piston engageable with said seat, the valve and seat diameter being less than that of said cylinder, said cylinder toward the outlet end thereof having an inlet opening from the cylinder exterior to the cylinder interior whereby when said valve is off its seat fluid may flow through said inlet openings to said outlet; a piston rod extending from said piston through the other end of said cylinder, means providing a restricted inlet opening to said other end of the cylinder, and means for feeding both said inlet openings with pressure fluid.

2. In a metering shut-off valve, a valve casing having an inlet adjacent the upstream end thereof and an annular valve seat at the other downstream end thereof, the seat leading to an outlet, a cylinder disposed in said casing in axial alignment with the valve seat and spaced radially from the casing to provide a substantially annular passage around the cylinder, a cylinder coaxial fluid metering opening from the casing inlet into the interior of the cylinder at its upstream end, said wall having a metering orifice therein connecting the inlet and outlet through said annular passage, a piston in said cylinder having at its upstream end a piston rod of less diameter than the piston and of less diameter than said coaxial opening, said rod extending through said opening and through the casing, the net areas of the opening and orifice being so related as to divide fluid flow, part to the annular passage and part to the cylinder, the piston on its downstream end having a valve extension of reduced diameter closable upon said valve seat, said cylinder having an opening therein at its extreme downstream end establishing communication between said annular passage and the cylinder interior adjacent the valve seat.

3. In a metering shut-off valve, a casing comprising a first section having an upstream chamber with a fluid inlet and a second section having a downstream chamber with a fluid outlet, said inlet and outlet being in the respective section walls, means connecting said sections together, means secured between said sections and constituting a wall between said upstream and downstream chambers, said wall having formed therein a first metering orifice connecting said chambers, a cylinder supported by said wall and disposed within said downstream chamber, the interior of said cylinder at its downstream end communicating freely with said downstream chamber, said wall forming a closure for the upstream end of the cylinder and having a second metering orifice establishing communication between said upstream chamber and the upstream end of the interior of said cylinder said two orifices having an area relation to divide flow therebetween, an annular valve seat in said second section providing the beginning of said outlet and coaxial with and spaced from the downstream end of said cylinder, a piston slidable within said cylinder and having a valve in its downstream end closable upon said seat, a piston rod extending from the upstream end of the piston through said partition and through said first section to the exterior thereof, said rod reducing the effective area of the upstream side of the piston to a value less than the effective area of the downstream side of the piston, and means mounted on the exterior of the casing for moving the piston rod with the piston and valve, axially from the position wherein the piston valve is seated.

4. An automatic shut-off valve for a fluid conduit system, comprising an inlet duct and an outlet duct, means forming a restricted flow orifice therebetween, hollow means having a movable partition defining an upstream chamber and a downstream chamber, said upstream chamber having a connection to said inlet duct, said connection comprising a second restricted flow orifice having a certain area relationship to the first said orifice, means secured to said partition and extending through said upstream chamber and through said hollow means to move said partition from outside of the hollow means and to reduce the effective area of said partition in the upstream chamber to less than the effective area of said partition in the downstream chamber, means connecting said downstream chamber with said fluid outlet duct, a valve seat in said duct downstream of both said downstream chamber and said first orifice, and a valve connected to said movable partition and disposed in the downstream chamber, operated by movement of the partition and engageable with said seat to stop fluid flow from the inlet duct and from the downstream chamber through the outlet duct upon movement of the partition in a downstream direction.

5. A valve according to claim 4 wherein said hollow means comprises a cylinder and said movable partition comprises a piston slidable in the cylinder, said piston forming at either end thereof within said cylinder said upstream and downstream chambers, and wherein said valve forms a part of the downstream end of the piston.

6. In a metering shut-off device including a housing, said housing having an inlet, means including a movable wall defining first and second chambers in said housing, said means for each of said chambers having a restricted opening communicating with said inlet, said openings being so related as to proportion flow from said inlet to both said chambers, said housing having an outlet communicating with the second chamber, a valve for said outlet connected to said wall for operation thereby, said valve being moved to closed position by said wall during the terminal phase of the movement thereof in a direction to contract said second chamber, said valve being so proportioned that when it is closed pressure on the effective area thereof exposed to inlet pressure will tend to hold it closed, and a rod extending from said movable wall through the opposite wall of said first chamber, whereby the effective area of said wall in the first chamber is less than the effective area thereof in the second chamber, whereby, when the pressures in said first and second chambers are substantially equal and said valve is open, said wall is urged in a direction to contract said first chamber.

HERBERT W. WISHART.

References Cited in the file of this patent

UNITED STATES PATENTS

| Number | Name | Date |
|---|---|---|
| 2,103,962 | Wineman | Dec. 28, 1937 |
| 2,354,161 | Waterman | July 18, 1944 |

FOREIGN PATENTS

| Number | Country | Date |
|---|---|---|
| 23,149 | Great Britain | of 1912 |
| 114,724 | Germany | of 1900 |